(12) United States Patent
Ochida et al.

(10) Patent No.: US 11,285,943 B2
(45) Date of Patent: Mar. 29, 2022

(54) VEHICLE CONTROL SYSTEM AND CONTROL METHOD

(71) Applicant: HONDA MOTOR CO., LTD., Tokyo (JP)

(72) Inventors: Jun Ochida, Wako (JP); Mahito Shikama, Wako (JP); Takuji Hiroma, Wako (JP); Tadahiko Kanoh, Wako (JP); Kanta Tsuji, Wako (JP); Takuyuki Mukai, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 3 days.

(21) Appl. No.: 16/534,394

(22) Filed: Aug. 7, 2019

(65) Prior Publication Data
US 2019/0359207 A1 Nov. 28, 2019

Related U.S. Application Data

(63) Continuation of application No. PCT/JP2017/040214, filed on Nov. 8, 2017.

(30) Foreign Application Priority Data

Feb. 23, 2017 (JP) .............................. JP2017-032534

(51) Int. Cl.
*B60W 30/09* (2012.01)
*G08G 1/04* (2006.01)
(Continued)

(52) U.S. Cl.
CPC ............... *B60W 30/09* (2013.01); *G05D 1/02* (2013.01); *G08G 1/04* (2013.01); *B60W 30/12* (2013.01)

(58) Field of Classification Search
CPC combination set(s) only.
See application file for complete search history.

(56) References Cited

U.S. PATENT DOCUMENTS 4,749,238 A * 6/1988 Singleton .............. B60T 13/662
303/15
5,761,630 A 6/1998 Sekine et al.
(Continued)

FOREIGN PATENT DOCUMENTS

CN 1898116 A 1/2007
CN 205940608 U 2/2017
(Continued)

OTHER PUBLICATIONS

Japanese Office Action issued for Japanese Patent Application No. 2019-501044 dated Oct. 26, 2020 (with Partial Translation).
(Continued)

*Primary Examiner* — Thomas G Black
*Assistant Examiner* — Ana D Thomas
(74) *Attorney, Agent, or Firm* — Thomas Horstemeyer, LLP

(57) ABSTRACT

A vehicle control system includes an automated driving control unit for controlling, based on surrounding environment information of a vehicle, driving, braking, and/or steering of the vehicle without depending on a driving operation of a driver; and a driving support control unit for supporting driving of the vehicle by the driver by controlling driving, braking, and/or steering of the vehicle. The control units are communicably connected. The driving support control unit can control, depending on a reception result of a signal received from the automated driving control unit, steering, and driving and/or braking of the vehicle based on the surrounding environment information without depending on the driving operation of the driver.

6 Claims, 9 Drawing Sheets

(51) Int. Cl.
*B60W 30/12* (2020.01)
*G05D 1/02* (2020.01)

(56) References Cited

U.S. PATENT DOCUMENTS

| | | | |
|---|---|---|---|
| 7,483,778 | B2 | 1/2009 | Armbruster et al. |
| 7,630,807 | B2 | 12/2009 | Yoshimura et al. |
| 8,401,757 | B2 | 3/2013 | Tokimasa et al. |
| 8,442,699 | B2 | 5/2013 | Takamatsu et al. |
| 8,645,022 | B2 | 2/2014 | Yoshimura et al. |
| 9,195,232 | B1 * | 11/2015 | Egnor ............... B60W 10/20 |
| 9,650,038 | B2 | 5/2017 | Yoshimura et al. |
| 9,783,197 | B2 | 10/2017 | Aoki et al. |
| 9,891,688 | B2 * | 2/2018 | Armbruster ......... H04L 67/12 |
| 10,691,123 | B2 | 6/2020 | Abe et al. |
| 2006/0116803 | A1 | 6/2006 | Armbruster et al. |
| 2007/0150118 | A1 | 6/2007 | Takamatsu et al. |
| 2010/0138123 | A1 | 6/2010 | Tokimasa et al. |
| 2013/0211658 | A1 * | 8/2013 | Bonefas ............ B65G 67/24 701/28 |
| 2014/0188343 | A1 | 7/2014 | Yoshimura et al. |
| 2015/0033054 | A1 * | 1/2015 | Armbruster ...... B60W 50/0098 713/323 |
| 2016/0288790 | A1 | 10/2016 | Aoki et al. |
| 2017/0212513 | A1 | 7/2017 | Iida et al. |
| 2017/0217436 | A1 | 8/2017 | Inomata |
| 2017/0240098 | A1 * | 8/2017 | Sweeney .............. B60Q 1/50 |
| 2018/0050692 | A1 | 2/2018 | Kim et al. |
| 2018/0170374 | A1 | 6/2018 | Otsuka et al. |

FOREIGN PATENT DOCUMENTS

| | | |
|---|---|---|
| DE | 102013020177 A1 | 6/2014 |
| JP | H8-263793 A | 10/1996 |
| JP | 2003-015742 A | 1/2003 |
| JP | 2005-521182 A | 7/2005 |
| JP | 2006-051922 A | 2/2006 |
| JP | 2007-253861 A | 10/2007 |
| JP | 2008-265618 A | 11/2008 |
| JP | 2009-023487 A | 2/2009 |
| JP | 2009-137582 A | 6/2009 |
| JP | 2009-146203 A | 7/2009 |
| JP | 2010-132032 A | 6/2010 |
| JP | 2014-088067 A | 5/2014 |
| JP | 2016-037077 A | 3/2016 |
| JP | 2016-080539 A | 5/2016 |
| JP | 2016131032 A | 7/2016 |
| JP | 2016-181032 A | 10/2016 |
| JP | 2016-190519 A | 11/2016 |
| JP | 2017-047694 A | 3/2017 |
| JP | 2017-138740 A | 8/2017 |
| WO | 2016/021340 A1 | 2/2016 |
| WO | 2016/080452 A1 | 5/2016 |
| WO | 2018/154859 A1 | 8/2018 |
| WO | 2018/154860 A1 | 8/2018 |
| WO | 2018/154861 A1 | 8/2018 |
| WO | 2018/154862 A1 | 8/2018 |

OTHER PUBLICATIONS

International Search Report for PCT/JP2017/040213 dated Dec. 26, 2017 (partially translated).
International Search Report for PCT/JP2017/040214 dated Feb. 6, 2018 (partially translated).
International Search Report for PCT/JP2017/040211 dated Jan. 23, 2018 (partially translated).
International Search Report for PCT/JP2017/040212 dated Feb. 13, 2018 (partially translated).
File history of related U.S. Appl. No. 16/534,448, filed Aug. 7, 2019.
File history of related U.S. Appl. No. 16/534,390, filed Aug. 7, 2019.
File history of related U.S. Appl. No. 16/534,383, filed Aug. 7, 2019.
Office Action issued for U.S. Appl. No. 16/534,448 dated Mar. 17, 2021.
Decision to Dismiss the Amendment (issued together with Final Rejection) for Japanese Patent Application No. 2019-501044 dated Mar. 1, 2021.
Office Action issued for U.S. Appl. No. 16/534,390 dated Dec. 11, 2020.
Office Action issued for U.S. Appl. No. 16/534,390 dated May 21, 2021.
Office Action issued for U.S. Appl. No. 16/534,448 dated Sep. 20, 2021.
Office Action issued for U.S. Appl. No. 16/534,390 dated Oct. 29, 2021.
Chinese Office Action issued for Chinese Patent Application No. 20178006468.9 dated Jan. 7, 2022.

* cited by examiner

VEHICLE CONTROL SYSTEM AND CONTROL METHOD

CROSS-REFERENCE TO RELATED APPLICATION(S)

This application is a continuation of International Patent Application No. PCT/JP2017/040214 filed on Nov. 8, 2017, which claims priority to and the benefit of Japanese Patent Application No. 2017-032534 filed on Feb. 23, 2017, the entire disclosures of which are incorporated herein by reference.

BACKGROUND OF THE INVENTION

Field of the Invention

The present invention relates to a vehicle control technique.

Description of the Related Art

To improve the reliability of automated driving control of a vehicle, providing of a monitor for a control apparatus (FIG. 11 of WO 2016/080452) and multiplexing of an apparatus (Japanese Patent Laid-Open No. 2003-015742) are proposed.

In the systems disclosed in WO 2016/080452 and Japanese Patent Laid-Open No. 2003-015742, multiplexed control units execute the same control operations and check the operation results. Substantially, the same processing is executed by a plurality of control units. Hence, the load on the control units is relatively high, and there is still room for improvement concerning the distribution of control processes.

SUMMARY OF THE INVENTION

It is an object of the present invention to improve reliability while attaining the distribution of control processes.

According to an aspect of the present invention, there is provided a vehicle control system comprising: an automated driving control unit configured to control, based on surrounding environment information of a vehicle, driving, braking, and/or steering of the vehicle without depending on a driving operation of a driver; and a driving support control unit configured to support driving of the vehicle by the driver by controlling driving, braking, and/or steering of the vehicle, wherein the automated driving control unit and the driving support control unit are communicably connected, and the driving support control unit is configured to control, depending on a reception result of a signal received from the automated driving control unit, steering, and driving and/or braking of the vehicle based on the surrounding environment information of the vehicle without depending on the driving operation of the driver.

According to another aspect of the present invention, there is provided a vehicle control system comprising: an automated driving control unit configured to control, based on surrounding environment information of a vehicle, driving, braking, and/or steering of the vehicle without depending on a driving operation of a driver; and a driving support control unit configured to support driving of the vehicle by the driver by controlling driving, braking, and/or steering of the vehicle during driving of the vehicle by the driver, wherein the automated driving control unit and the driving support control unit are communicably connected, and the driving support control unit is configured to control, depending on a reception result of a signal received from the automated driving control unit, steering, and driving and/or braking of the vehicle based on the surrounding environment information of the vehicle without depending on the driving operation of the driver.

According to still another aspect of the present invention, there is provided a control method of a vehicle control system including: an automated driving control unit configured to control, based on surrounding environment information of a vehicle, driving, braking, and/or steering of the vehicle without depending on a driving operation of a driver; and a driving support control unit configured to support driving of the vehicle by the driver by controlling driving, braking, and/or steering of the vehicle, the method comprising: receiving a signal output from the automated driving control unit by the driving support control unit; and controlling, depending on a reception result in the receiving, steering, and driving and/or braking of the vehicle based on the surrounding environment information of the vehicle without depending on the driving operation of the driver.

Further features of the present invention will become apparent from the following description of exemplary embodiments (with reference to the attached drawings).

DESCRIPTION OF THE EMBODIMENTS

First Embodiment

Figure 1:
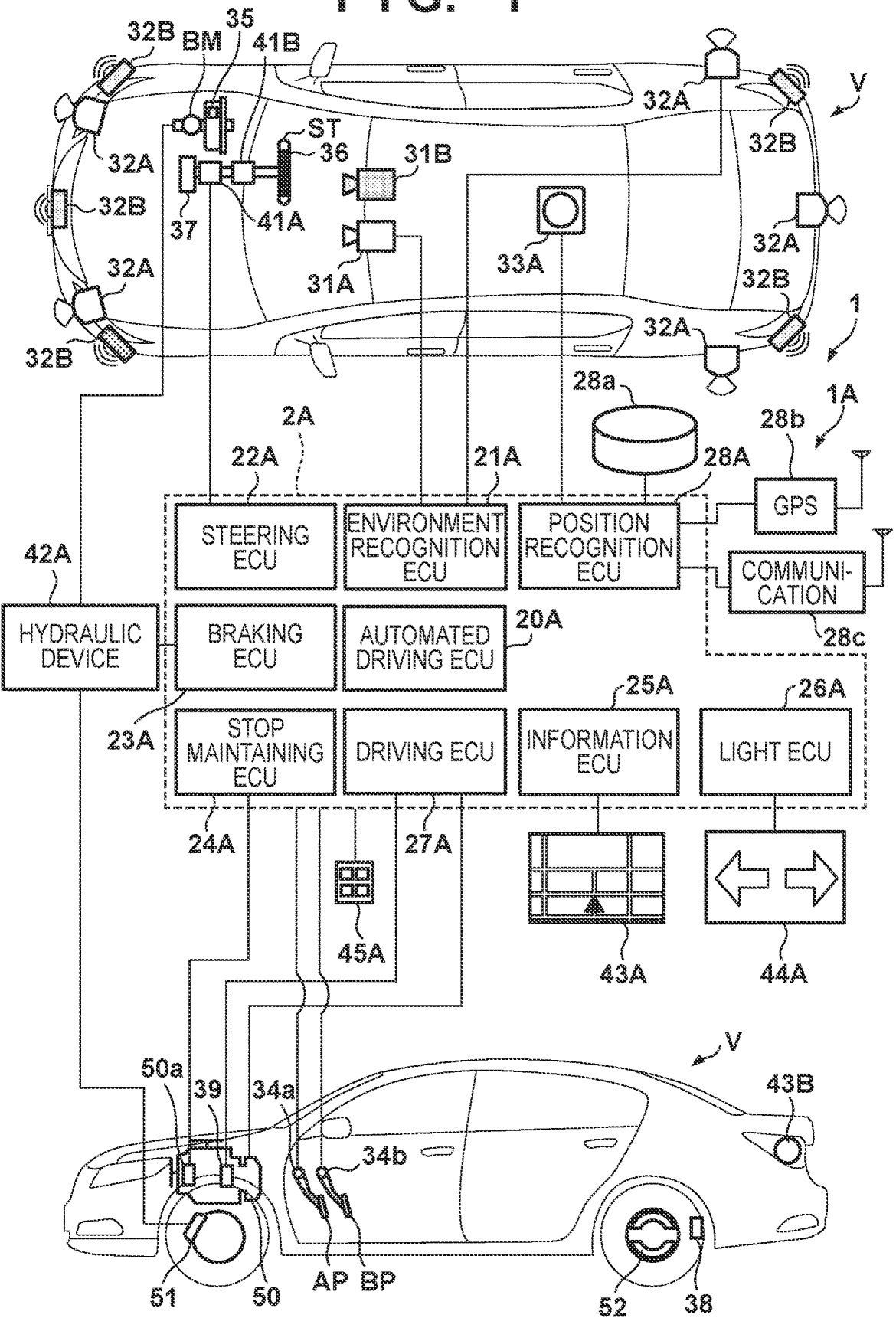
FIG. 1 is a block diagram of a vehicle control system according to an embodiment.
Figure 2:
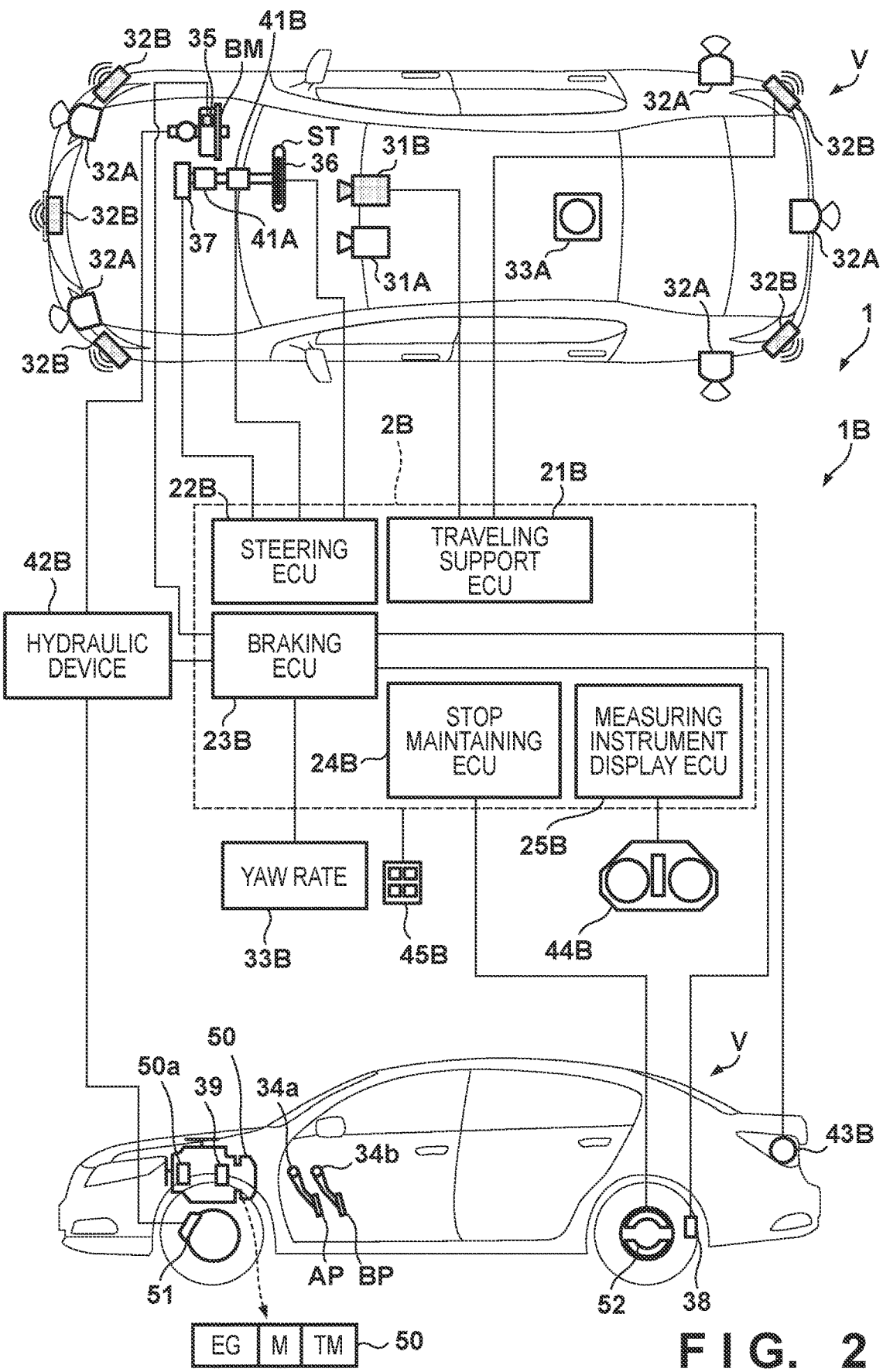
FIG. 2 is a block diagram of the vehicle control system according to the embodiment.
Figure 3:
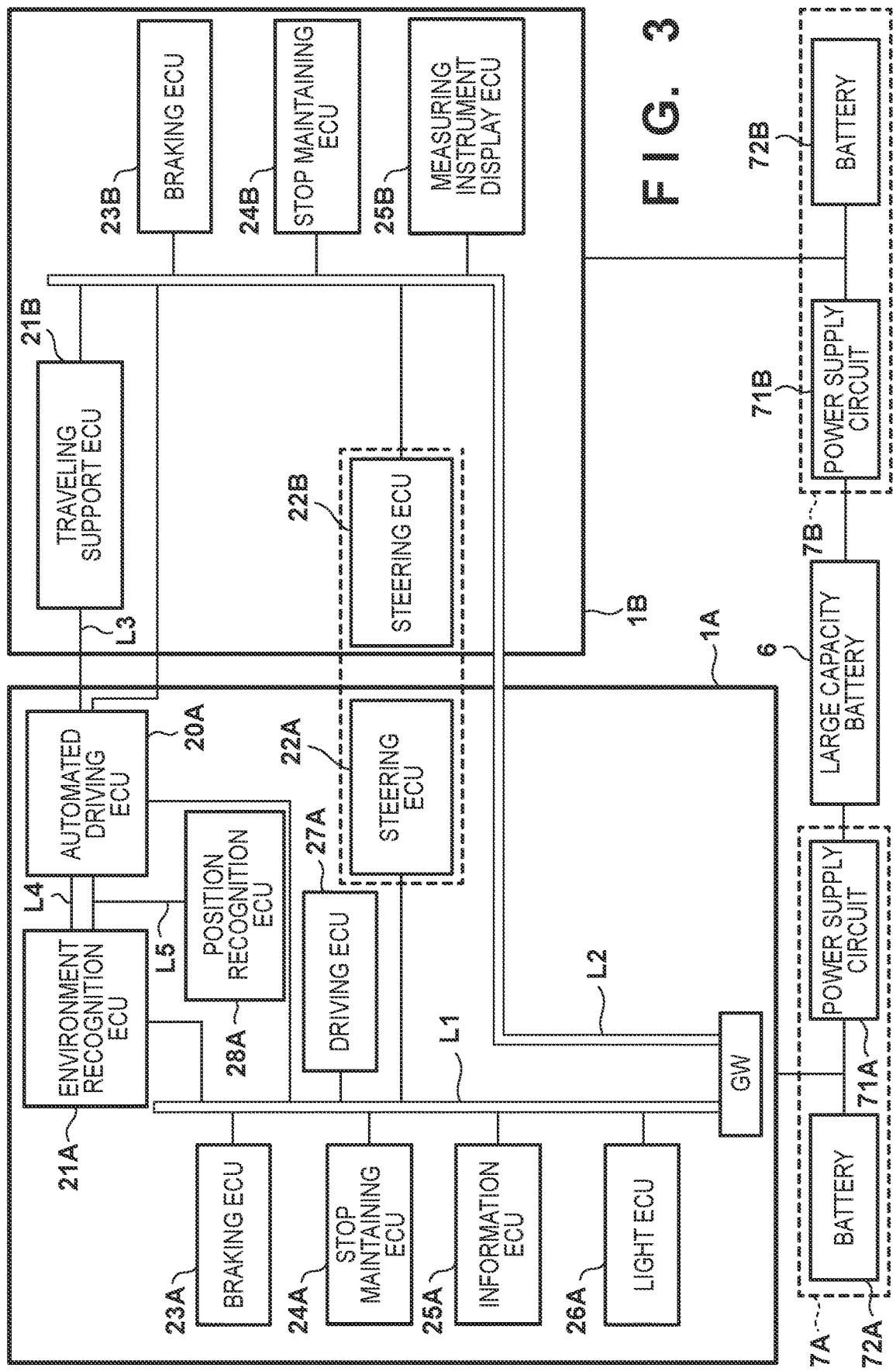
FIG. 3 is a block diagram of the vehicle control system according to the embodiment.

FIGS. 1 to 3 are block diagrams of a vehicle control system 1 according to an embodiment of the present invention. The vehicle control system 1 controls a vehicle V. In each of FIGS. 1 and 2, an outline of the vehicle V is shown in a plan view and a side view. As an example, the vehicle V is a sedan-type four-wheeled vehicle. The vehicle control system 1 includes a control apparatus 1A and a control apparatus 1B. FIG. 1 is a block diagram showing the control apparatus 1A, and FIG. 2 is a block diagram showing the control apparatus 1B. FIG. 3 mainly shows the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the system. The control apparatus 1A mainly performs automated driving control or normal operation control in manual driving, and the control apparatus 1B mainly performs traveling support control concerning risk avoidance and the like. Traveling support will sometimes be referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 28A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 28A are given. For example, the ECU 20A is denoted by "automated driving ECU".

The ECU 20A executes control associated with automated driving of the vehicle V. In automated driving, driving (acceleration of the vehicle V by the power plant 50, and the like), steering, and/or braking of the vehicle V is automatically performed independently of the driving operation of the driver. In this embodiment, driving, steering, and braking are automatically performed.

The ECU 21A is an environment recognition unit configured to recognize the traveling environment of the vehicle V based on the detection results of detection units 31A and 32A that detect the surrounding situation of the vehicle V. The ECU 21A generates target data (to be described later) as surrounding environment information.

In this embodiment, the detection unit 31A is an image capturing device (to be sometimes referred to as the camera 31A hereinafter) configured to detect an object around the vehicle V by image capturing. The camera 31A is provided on the roof front portion of the vehicle V to capture the front side of the vehicle V. When images captured by the camera 31A are analyzed, the contour of a target or a division line (a white line or the like) of a lane on a road can be extracted.

In this embodiment, the detection unit 32A is a lidar (light detection and ranging) (to be sometimes referred to as the lidar 32A hereinafter) configured to detect an object around the vehicle V by light, and detects a target around the vehicle V or measures the distance to a target. In this embodiment, five lidars 32A are provided; one at each corner of the front portion of the vehicle V, one at the center of the rear portion, and one on each side of the rear portion. The number of lidars 32A and their arrangement can appropriately be selected.

The ECU 22A is a steering control unit configured to control an electric power steering device 41A. The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M.

The ECU 24A is a stop maintaining control unit configured to control an electric parking lock device 50a provided in the automatic transmission TM. The electric parking lock device 50a includes a mechanism that mainly locks the internal mechanism of the automatic transmission TM when the P range (parking range) is selected. The ECU 24A can control lock and unlock by the electric parking lock device 50a.

The ECU 25A is an in-vehicle notification control unit configured to control an information output device 43A that notifies information in the vehicle. The information output device 43A includes, for example, a display device such as a head-up display and a voice output device. The information output device 43A may further include a vibration device. The ECU 25A causes the information output device 43A to output, for example, various kinds of information such as a vehicle speed and an atmospheric temperature and information such as a path guidance.

The ECU 26A is an external notification control unit configured to control an information output device 44A that notifies information outside the vehicle. In this embodiment, the information output device 44A is a direction indicator (hazard lamp). The ECU 26A controls blinking of the information output device 44A serving as a direction indicator, thereby notifying the exterior of the vehicle of the advancing direction of the vehicle V. In addition, the ECU 26A controls blinking of the information output device 44A serving as a hazard lamp, thereby increasing the attention of the exterior to the vehicle V.

The ECU 27A is a driving control unit configured to control the power plant 50. In this embodiment, one ECU 27A is assigned to the power plant 50. However, one ECU may be applied to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the traveling state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle such that the driver can operate it, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the traveling environment of the vehicle V based on the detection results of detection units 31B and 32B that detect the surrounding situation of the vehicle V, and also serves as a traveling support unit configured to execute control associated with traveling support (in other words, driving support) of the vehicle V. The ECU 21B generates target data (to be described later) as surrounding environment information.

In this embodiment, the detection unit 31B is an image capturing device (to be sometimes referred to as the camera 31B hereinafter) configured to detect an object around the vehicle V by image capturing. The camera 31B is provided on the roof front portion of the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

As the contents of traveling support, the ECU 21B can execute control of, for example, a collision reduction brake, a lane departure suppression system, and the like. If the possibility of collision against an obstacle ahead rises, the collision reduction brake instructs the ECU 23B to be described later to operate the brake device 51, thereby supporting collision avoidance. If the possibility of departure of the vehicle V from a traveling lane rises, the lane departure suppression system instructs the ECU 22B to be described later to operate an electric power steering device 41B, thereby supporting lane departure avoidance. Note that such traveling support control executable by the ECU 21B can also be executed in the control apparatus 1A because of the arrangement of the system according to this embodiment.

The ECU 22B is a steering control unit configured to control the electric power steering device 41B. The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B through a communication line L2 to be described later, and the electric power steering device 41B can be controlled based on the detection result of the steering angle sensor 37. The ECU 22B can acquire the detection result of a sensor 36 that detects whether the driver is gripping the steering handle ST, and can monitor the gripping state of the driver.

The ECU 23B is a braking control unit configured to control a hydraulic device 42B. A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, a wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and based on the detection results of these, an ABS function, traction control, and the posture control function for the vehicle V are implemented. For example, the ECU 23B adjusts the braking force of each wheel based on the detection result of the wheel speed sensor 38 provided in each of the four wheels, thereby suppressing skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external notification control unit configured to control an information output device 43B that notifies information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle notification control unit configured to control an information output device 44B that notifies information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle such that the driver can operate it, and accepts input of an instruction or information from the driver.

<Communication Lines>

An example of communication lines of the control system 1, which communicably connect the ECUs, will be described with reference to FIG. 3. The control system 1 includes communication lines L1 to L5 of wired communication. The ECUs 20A to 27A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECU 20A and the ECU 21B. The communication line L5 connects the ECU 20A, the ECU 21A, and the ECU 28A.

The protocols of the communication lines L1 to L5 may be identical or different, and may be changed in accordance with the communication environment such as a communication amount and durability. For example, the communication lines L3 and L4 may be Ethernet® from the viewpoint of communication speed. For example, the communication lines L1, L2, and L5 may be CAN.

The control apparatus 1A includes a gateway GW. The gateway GW relays the communication line L1 and the communication line L2. For this reason, for example, the ECU 21B can output a control instruction to the ECU 27A through the communication line L2, the gateway GW, and the communication line L1.

<Power Supply>

The power supply of the control system 1 will be described with reference to FIG. 3. The control system 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7B is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B. The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers.

<Redundancy>

Functions common to the control apparatus 1A and the control apparatus 1B will be described. When the same functions are made redundant, the reliability of the control system 1 can be improved. In addition, some redundant functions provide different functions, instead of multiplexing the same functions. This suppresses an increase in cost caused by the redundancy of functions.

[Actuator System]

Steering

The control apparatus 1A includes the electric power steering device 41A and the ECU 22A that controls this. The control apparatus 1B also includes the electric power steering device 41B and the ECU 22B that controls this.

Braking

The control apparatus 1A includes the hydraulic device 42A and the ECU 23A that controls this. The control apparatus 1B includes the hydraulic device 42B and the ECU 23B that controls this. All of these can be used for braking of the vehicle V. On the other hand, the main function of the braking mechanism of the control apparatus 1A is the distribution of the braking force by the brake device 51 and the braking force by the regenerative braking of the motor M. On the other hand, the main function of the braking mechanism of the control apparatus 1B is posture control and the like. Although the functions are common concerning braking, functions different from each other are provided.

Stop Maintaining

The control apparatus 1A includes the electric parking lock device 50a and the ECU 24A that controls this. The control apparatus 1B includes the electric parking brake device 52 and the ECU 24B that controls this. All of these can be used to maintain the stop of the vehicle V. On the other hand, although the electric parking lock device 50a is a device that functions when the P range of the automatic transmission TM is selected, the electric parking brake device 52 is a device that locks a rear wheel. Although the functions are common concerning stop maintaining of the vehicle V, functions different from each other are provided.

In-Vehicle Notification

The control apparatus 1A includes the information output device 43A and the ECU 25A that controls this. The control apparatus 1B includes the information output device 44B and the ECU 25B that controls this. All of these can be used to notify the driver of information. On the other hand, the information output device 43A is, for example, a head-up display, and the information output device 44B is a display device such as a measuring instrument. Although the functions are common concerning in-vehicle notification, display devices different from each other can be employed.

External Notification

The control apparatus 1A includes the information output device 44A and the ECU 26A that controls this. The control apparatus 1B includes the information output device 43B and the ECU 23B that controls this. All of these can be used to notify information outside the vehicle. On the other hand, the information output device 44A is a direction indicator (hazard lamp), and the information output device 43B is a brake lamp. Although the functions are common concerning external notification, functions different from each other are provided.

Different Points

The control apparatus 1A includes the ECU 27A that controls the power plant 50. However, the control apparatus 1B does not include a unique ECU that controls the power plant 50. In this embodiment, both the control apparatuses 1A and 1B can solely perform steering, braking, and stop maintaining. Hence, even if the control apparatus 1A or control apparatus 1B suffers performance degradation, power supply shutdown, or communication interruption, it is possible to decelerate and maintain the stop state while suppressing lane departure. Additionally, as described above, the ECU 21B can output a control instruction to the ECU 27A through the communication line L2, the gateway GW, and the communication line L1, and the ECU 21B can also control the power plant 50. Since the control apparatus 1B does not include a unique ECU that controls the power plant 50, an increase in cost can be suppressed. However, the control apparatus 1B may include a unique ECU.

[Sensor System]

Detection of Surrounding Situation

The control apparatus 1A includes the detection units 31A and 32A. The control apparatus 1B includes the detection units 31B and 32B. All of these can be used to recognize the traveling environment of the vehicle V. On the other hand, the detection unit 32A is a lidar, and the detection unit 32B is a radar. The lidar is generally advantageous in detecting a shape. Additionally, the radar is generally more advantageous than the lidar from the viewpoint of cost. When these sensors of different characteristics are used, it is possible to improve target recognition performance and reduce the cost. Both the detection units 31A and 31B are cameras. Cameras of different characteristics may be used. For example, one of them may be a camera of a resolution higher than the other. In addition, the angles of view may be different from each other.

Vehicle Speed

The control apparatus 1A includes the rotation speed sensor 39. The control apparatus 1B includes the wheel speed sensor 38. Both can be used to detect the vehicle speed. On the other hand, the rotation speed sensor 39 detects the rotation speed of the output shaft of the automatic transmission TM, and the wheel speed sensor 38 detects the rotation speed of the wheels. Although the sensors are common concerning the capability of detecting the vehicle speed, the detection targets are different from each other.

Yaw Rate

The control apparatus 1A includes the gyro 33A. The control apparatus 1B includes the yaw rate sensor 33B. Both can be used to detect the angular velocity about the vertical axis of the vehicle V. On the other hand, the gyro 33A is used to determine the route of the vehicle V, and the yaw rate sensor 33B is used for posture control of the vehicle V, and the like. Although the sensors are common concerning the capability of detecting the angular velocity of the vehicle V, the use purposes are different from each other.

Steering Angle and Steering Torque

The control apparatus 1A includes a sensor that detects the rotation amount of the motor of the electric power steering device 41A. The control apparatus 1B can acquire the detection result of the steering angle sensor 37 without an intervention of the gateway GW. Both can be used to detect the steering angle of the front wheels. In the control apparatus 1A, an increase in cost can be suppressed by using the sensor that detects the rotation amount of the motor of the electric power steering device 41A, instead of additionally providing the steering angle sensor 37. However, the steering angle sensor 37 may additionally be provided in the control apparatus 1A.

In addition, when both the electric power steering devices 41A and 41B include torque sensors, the steering torque can be recognized in both the control apparatuses 1A and 1B.

Braking Operation Amount

The control apparatus 1A includes the operation detection sensor 34b. The control apparatus 1B includes the pressure sensor 35. Both can be used to detect the braking operation amount of the driver. On the other hand, the operation detection sensor 34b is used to control the distribution of the braking force by the four brake devices 51 and the braking force by regenerative braking of the motor M, and the pressure sensor 35 is used for posture control and the like. Although the sensors are common concerning detection of the braking operation amount, the use purposes are different from each other.

[Power Supply]

The control apparatus 1A receives power supply from the power supply 7A, and the control apparatus 1B receives power supply from the power supply 7B. Since the power is supplied to any one of the control apparatuses 1A and 1B even in a case in which the power supply of one of the power supply 7A and the power supply 7B is shut down or lowers, it is possible to more reliably ensure the power supply and improve the reliability of the control system 1. If the power supply of the power supply 7A is shut down or lowers, it is difficult to perform communication between the ECUs through the gateway GW provided in the control apparatus 1A. However, in the control apparatus 1B, the ECU 21B can communicate with the ECUs 22B to 24B and the information output device 44B through the communication line L2.

<Example of Control>

Figure 4:
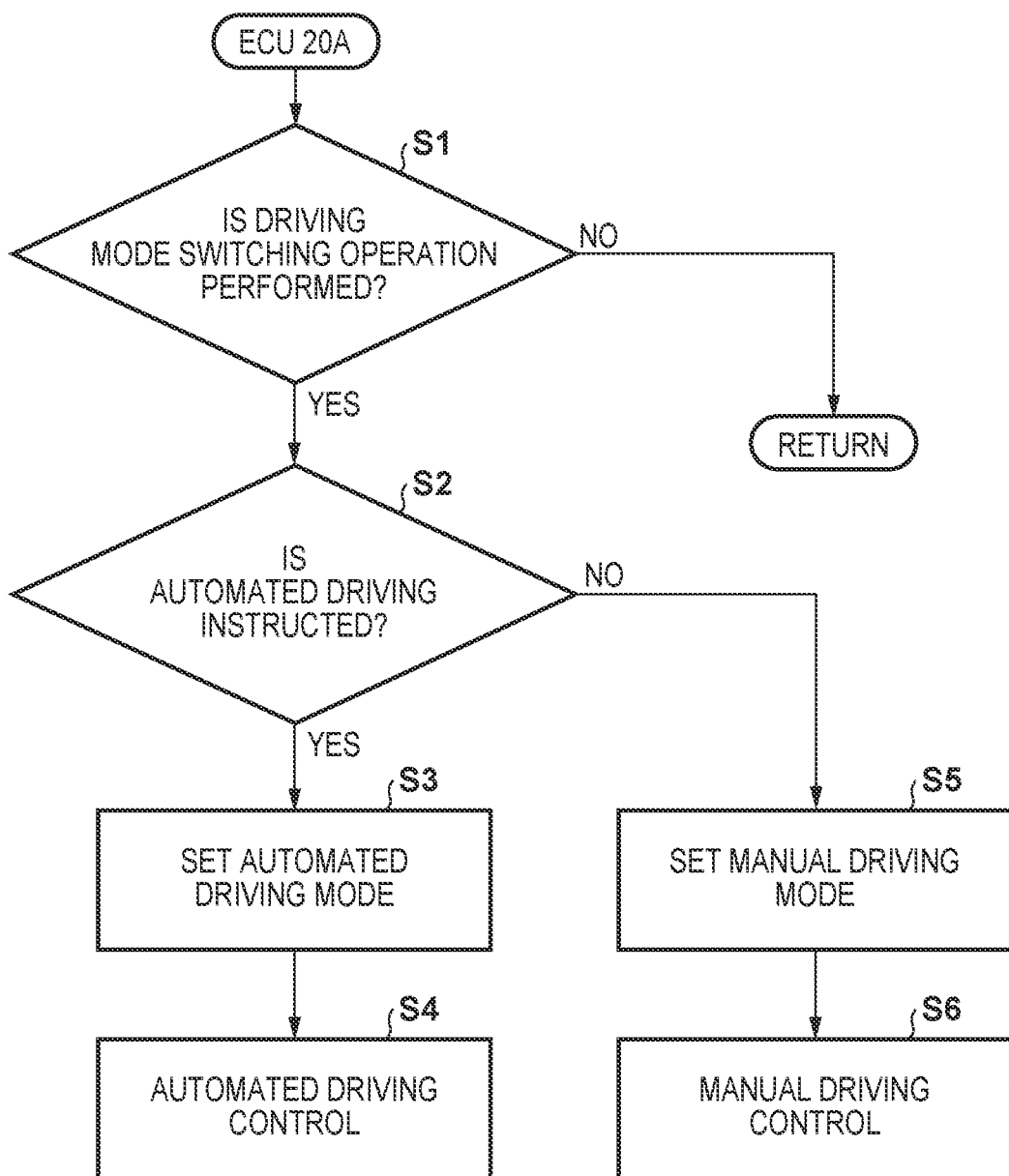
FIG. 4 is a flowchart showing an example of processing executed by the system according to the embodiment.

An example of control of the control system 1 will be described. FIG. 4 is a flowchart showing driving mode switching processing executed by the ECU 20A.

In step S1, it is determined whether a driving mode switching operation is performed by the driver. The driver can input a switching instruction between an automated driving mode and a manual driving mode by, for example, an operation on the input device 45A. If the switching operation is performed, the process advances to step S2. Otherwise, the processing is ended.

In step S2, it is determined whether the switching operation instructs automated driving. If the switching operation instructs automated driving, the process advances to step S3. If the switching operation instructs manual driving, the process advances to step S5. In step S3, the automated driving mode is set. In step S4, automated driving control is started. In step S5, the manual driving mode is set. In step S6, manual driving control is started.

In manual driving control, driving, steering, and braking of the vehicle V are performed in accordance with the driving operation of the driver. The ECU 21B appropriately executes driving support control in accordance with the detection results of the detection units 31B and 32B. It can be said that the driving support control by the ECU 21B is performed during driving of the vehicle by the driver.

In automated driving control, the ECU 20A outputs a control instruction to the ECUs 22A, 23A, and 27A to control steering, braking, and driving of the vehicle V, thereby causing the vehicle V to automatically travel without depending on the driving operation of the driver. The ECU 20A sets the traveling path of the vehicle V, and causes the vehicle V to travel along the set traveling path by referring to the position recognition result of the ECU 28A or surrounding environment information (target detection result).

Figure 5:
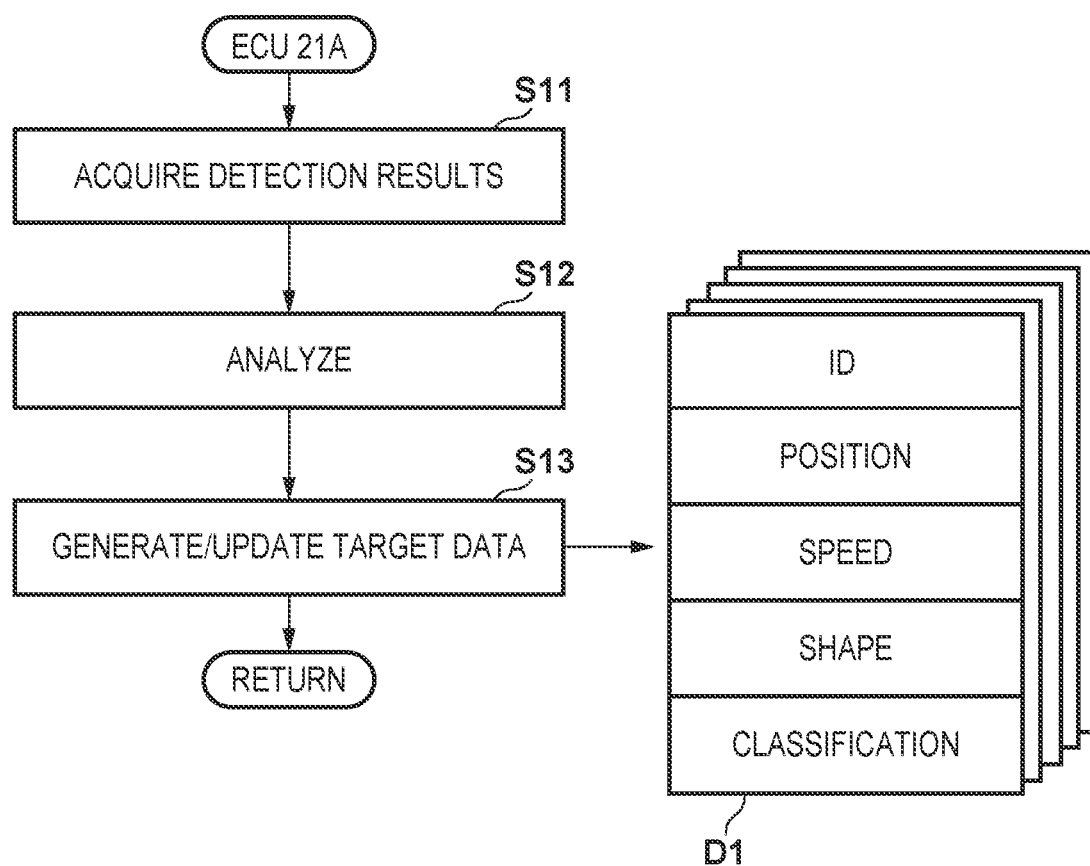
FIG. 5 is a flowchart showing an example of processing executed by the system according to the embodiment.
Figure 6:
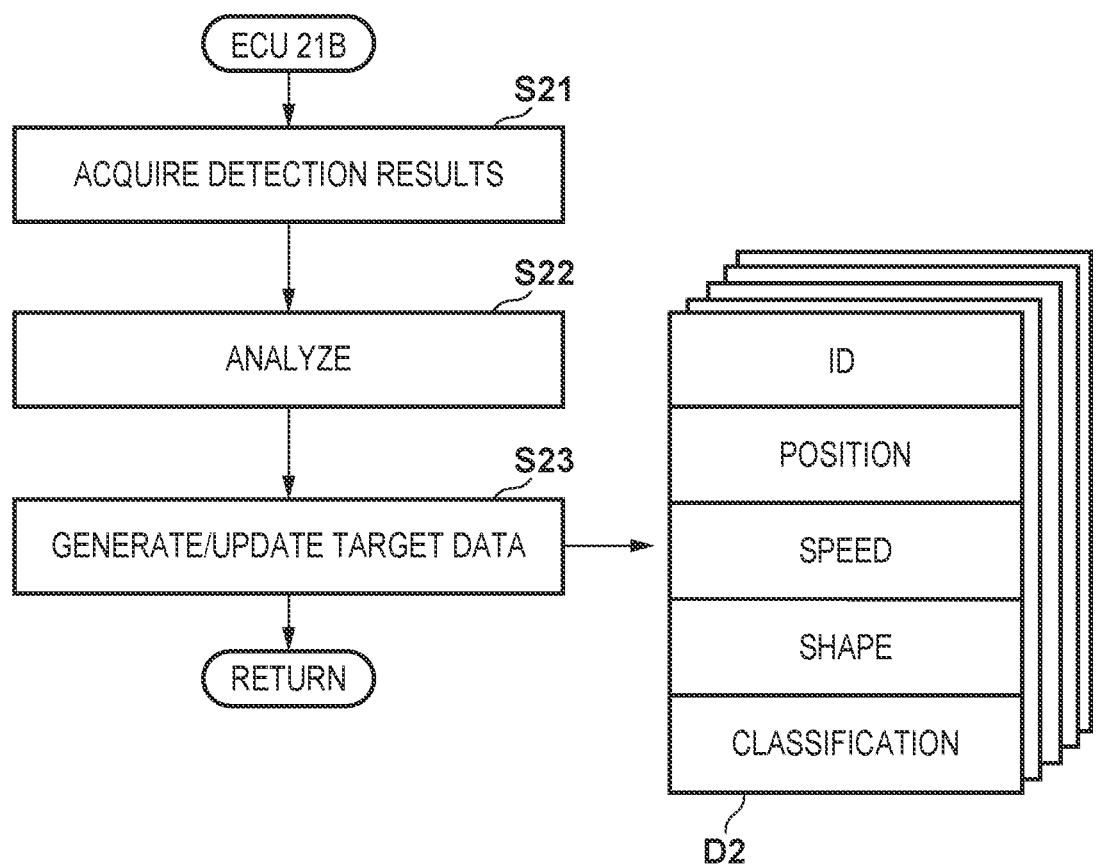
FIG. 6 is a flowchart showing an example of processing executed by the system according to the embodiment.
Figure 7:
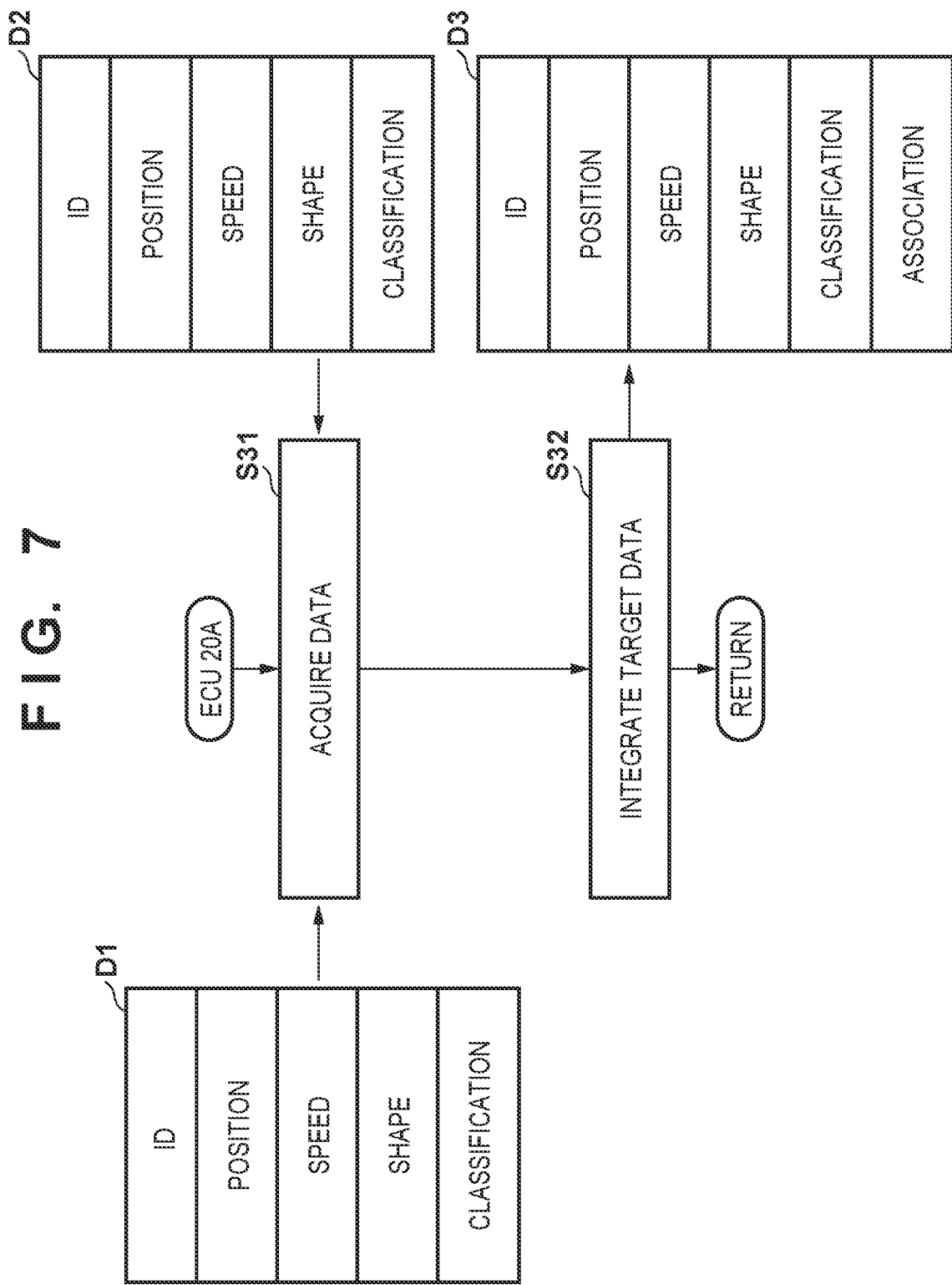
FIG. 7 is a flowchart showing an example of processing executed by the system according to the embodiment.

As the target detection result, target data that integrates the detection results of the detection units 31A and 32A and the detection results of the detection units 31B and 32B can be used. FIGS. 5 to 7 show examples of processing concerning target data generation.

FIG. 5 shows target data generation/updating processing periodically executed by the ECU 21A. In step S11, the detection results of the detection units 31A and 32A are acquired. In step S12, the detection results acquired in step S11 are analyzed to recognize individual targets. In step S13, target data is generated or updated. The ECU 21A stores target data D1 generated by it in an internal storage device and independently manages the target data D1. The target data D1 is generated for each target. If a target is recognized as an existing target in step S12, the contents of the corresponding target data D1 that is stored are updated as needed. If a target is recognized as a new target in step S12, corresponding target data D1 is newly generated.

The exemplified target data D1 includes an ID assigned to each target, position information of the target, the information of the moving speed of the target, the information of the shape of the target, and the classification of the target (fixed object, moving object, or the like).

FIG. 6 shows target data generation/updating processing periodically executed by the ECU 21B. The processing is basically similar to the processing of the ECU 21A. In step S21, the detection results of the detection units 31B and 32B are acquired. In step S22, the detection results acquired in step S21 are analyzed to recognize individual targets. In step S23, target data is generated or updated. Even the ECU 21B stores target data D2 generated by it in an internal storage device and independently manages the target data D2. The target data D2 is generated for each target. If a target is recognized as an existing target in step S22, the contents of the corresponding target data D2 that is stored are updated as needed. If a target is recognized as a new target in step S22, corresponding target data D2 is newly generated.

The exemplified target data D2 has a structure similar to that of the target data D1, and includes an ID assigned to each target, position information of the target, the information of the moving speed of the target, the information of the shape of the target, and the classification of the target. In the target data D1 and the target data D2, the items of information may be the same or may be different, as in this embodiment.

FIG. 7 shows target data integration processing periodically executed by the ECU 20A. The ECU 20A generates target data D3 that integrates the target data D1 and the target data D2, and executes control based on the target data D3 at the time of automated driving control.

In step S31, the target data D1 is acquired from the ECU 21A, and the target data D2 is acquired from the ECU 21B. In step S32, the target data D1 and the target data D2 acquired in step S31 are integrated to generate the target data D3. The target data D3 is stored in an internal storage device and independently managed. Note that if the target data D1 and the target data D2 acquired in step S31 are existing targets, the contents of the corresponding target data D3 that is stored are updated as needed.

The exemplified target data D3 has a structure similar to that of the target data D1 and D2, and includes an ID assigned to each target, position information of the target, the information of the moving speed of the target, the information of the shape of the target, the classification of the target, and the information of association. The information of association is information representing the target data D1 and D2 corresponding to the target data D3, and is, for example, the information of each ID in the target data D1 and D2.

When integrating the target data D1 and D2, if one of the data is missing concerning the information of the same item, the other data is used as the information for the target data D3. If the pieces of information in the target data D1 and D2 conflict, for example, one of them can be preferred. The target data D1 is based on the detection results of the camera 31A and the lidar 32A, and the target data D2 is based on the detection results of the camera 31B and the radar 32B. For this reason, the data are different in the accuracy and the characteristic. Hence, which one of the data should be preferred may be determined for each item, and one of the data may be preferred. As another example, the average value of data in the target data D1 and D2 may be calculated, or a weighted value may be employed. That is, a newly calculated value or information may be used.

When the automated driving control is executed based on the target data D3 generated in the above-described way, more reliable control can be executed concerning recognition of a traveling environment.

Figure 8:
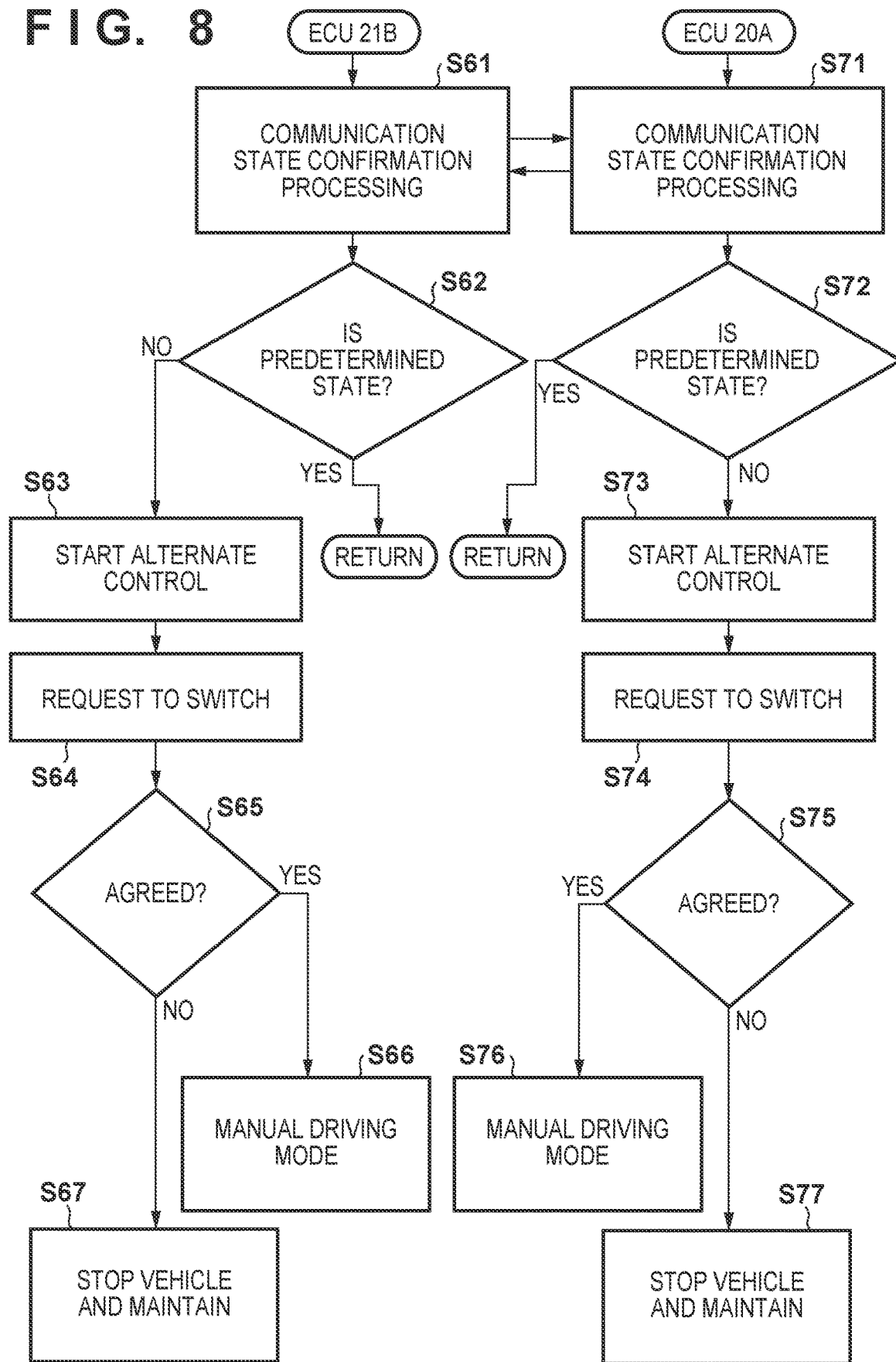
FIG. 8 is a flowchart showing an example of processing executed by the system according to the embodiment.

Processing performed in a case in which performance degradation, or the like occurs in the ECU 20A or the ECU 21B during automated driving control will be described next. FIG. 8 is a flowchart showing an example of processing of the ECU 20A and the ECU 21B showing an example. The processing shown in FIG. 8 can periodically be performed during the automated driving mode.

The ECU 20A and the ECU 21B perform processing of confirming each other's communication states (steps S61 and S71). For example, one of them outputs a response request to the other and determines whether a response is received. Alternatively, one of them transmits information to the other, and the other determines whether the received information is predetermined information.

In step S62, the ECU 21B determines whether the processing result in step S61 represents a predetermined state. The predetermined state indicates, for example, a case in which reception of a signal from the ECU 20A can be confirmed. A state other than the predetermined state indicates, for example, a case in which reception of a signal from the ECU 20A cannot be confirmed. The case in which reception of a signal can be confirmed is, for example, a case in which a signal according to predetermined information can be received. The case in which reception of a signal cannot be confirmed is, for example, not only a case in which a signal cannot be received but also a case in which a signal is received, but it is not a correct signal (predetermined information in the above example).

If the state is the predetermined state, the ECU 21B determines that performance degradation or the like has not occurred in the ECU 20A, and ends the processing. If the state is not the predetermined state, the process advances to step S63 to start alternate control. The alternate control according to this embodiment decelerates and stops the vehicle V. The ECU 21B instructs the ECU 25B to make a notification, and causes the information output device 44B to display a message representing that the vehicle V decelerates and stops and notify the driver of it. In addition, the ECU 21B instructs the ECU 23B to make a notification, and lights or blinks the brake lamp 43B to call the attention of the following vehicle. Note that the ECU 21B may instruct the light ECU 26A to make a notification and operate the information output device 44A (blinks the hazard lamp). Then, the ECU 21B instructs the ECU 23B to do braking, and decelerates the vehicle V. At this time, the ECU 21B instructs the ECU 22B to do steering based on the detection results of the detection units 31B and 32B so the vehicle V does not depart from the lane.

After the start of the alternate control, in step S64, the ECU 21B requests the driver to do switching (takeover) from automated driving to manual driving. This switching request is done by, for example, displaying the switching request on the information output device 44B. In step S65, it is determined whether the driver has agreed with the switching request. The driver can indicate the intention of agreement by, for example, the input device 45B. Alternatively, the intention of agreement can be confirmed based on the detection result of steering by the driver, which is obtained by the steering torque sensor.

If the driver agrees, the process advances to step S66 to set the manual driving mode. This setting may be, for example, processing in which the ECU 21B instructs the ECUs 21A to 26A of the control apparatus 1A and the ECUs 22B to 25B of the control apparatus 1B to end the automated driving mode and neglect a control instruction from the ECU 20A. The ECUs of the control apparatuses 1A and 1B control the traveling of the vehicle V in accordance with the driving operation of the driver. However, since the possibility of performance degradation or the like may exist in the ECU 20A, the ECU 21B may display, on the information output device 44B, a message that promotes to take the vehicle V to a maintenance workshop.

If the agreement of the driver cannot be confirmed, the vehicle V stops after a while due to the progress of alternate control. In step S67, the ECU 21B determines the stop of the vehicle V from the detection result of the wheel speed sensor 38, and upon determining that the vehicle V has stopped, instructs the ECU 24B to operate the electric parking brake device 52, thereby maintaining the stop of the vehicle V.

The processing of the ECU 20A will be described next. In step S72, the ECU 20A determines whether the processing result in step S71 represents a predetermined state. Also here, the predetermined state indicates, for example, a case in which reception of a signal from the ECU 21B can be confirmed. A state other than the predetermined state indicates, for example, a case in which reception of a signal from the ECU 21B cannot be confirmed. The case in which reception of a signal can be confirmed is, for example, a case in which a signal according to predetermined information can be received. The case in which reception of a signal cannot be confirmed is, for example, not only a case in which a signal cannot be received but also a case in which a signal is received, but it is not a correct signal (predetermined information in the above example).

If the state is the predetermined state, the ECU 20A determines that performance degradation or the like has not occurred in the ECU 21B, and ends the processing. If the state is not the predetermined state, the process advances to step S73 to start alternate control. Even if performance degradation or the like occurs in the ECU 21B, the ECU 20A can continue automated driving control. However, assuming a case in which performance degradation or the like occurs in the ECU 20A, if the possibility of performance degradation or the like exists in the ECU 21B, alternate control is performed. The alternate control here is similar to the alternate control executed by the ECU 21B, and the ECU 20A decelerates and stops the vehicle V. However, the devices to be used are different.

The ECU 20A instructs the ECU 25A to make a notification, and causes the information output device 43A to output a message representing that the vehicle V decelerates and stops and notify the driver of it. In addition, the ECU 20A instructs the ECU 26A to make a notification, and blinks the information output device 44A (hazard lamp) to call the attention of the following vehicle. Then, the ECU 20A instructs the ECU 23A to do braking, and decelerates the vehicle V. At this time, the ECU 20A instructs the ECU 22A to do steering based on the detection results of the detection units 31A and 32A so the vehicle V does not depart from the lane.

After the start of the alternate control, in step S74, the ECU 20A requests the driver to do switching (takeover) from automated driving to manual driving. This switching request is done by, for example, displaying the switching request on the information output device 43A. In step S75, it is determined whether the driver has agreed with the switching request. The driver can indicate the intention of agreement by, for example, the input device 45A. Alternatively, the intention of agreement can be confirmed based on the detection result of steering by the driver, which is obtained by the steering torque sensor.

If the driver agrees, the process advances to step S76 to set the manual driving mode. When the mode is switched to the manual driving mode, the ECUs of the control apparatuses 1A and 1B control the traveling of the vehicle V in accordance with the driving operation of the driver. The ECU 20A may also instruct the ECUs 21A to 26A of the control apparatus 1A and the ECUs 22B to 25B of the control apparatus 1B to neglect a control instruction from the ECU 21B. Note that since the possibility of performance degradation or the like exists in the ECU 21B, the ECU 20A may output, to the information output device 43A, a message that promotes to take the vehicle V to a maintenance workshop.

If the agreement of the driver cannot be confirmed, the vehicle V stops after a while due to the progress of alternate control. In step S77, the ECU 20A determines the stop of the vehicle V from the detection result of the rotation speed sensor 39, and upon determining that the vehicle V has stopped, instructs the ECU 24A to operate the electric parking lock device 50a, thereby maintaining the stop of the vehicle V. As described above, both the control apparatuses 1A and 1B can execute the alternate control.

Note that in this embodiment, communication state confirmation processing is performed in steps S61 and S71. This processing may be performed in the communication processing executed by the ECU 20A and the ECU 21B for vehicle control. As the method of determining whether the state is a predetermined state or not, a checksum may be confirmed, and if a normal control signal cannot be received continuously a predetermined number of times, it may be determined that the state is not the predetermined state. Alternatively, a determination method using an alive counter may be used.

The alternate control may be control including switching at least a part of vehicle control performed in the predetermined state to another control. The alternate control may be control using, as the control devices and the actuators, control devices and actuators different from those in the predetermined state. The alternate control may be control using control devices and actuators similar to the predetermined state but using control amounts different from those in the control performed in the predetermined state. The alternate control may be control to which control that is not performed in the predetermined state is added. The alternate control may automate steering, and driving and/or braking of the vehicle V.

A representative example of the alternate control is control of decelerating and stopping the vehicle, as in this embodiment. Another example of the alternate control may be control of maintaining traveling at a speed lower than in the predetermined state. The alternate control may decelerate the vehicle to suppress approach to or contact with an obstacle or a preceding vehicle. The alternate control may include maintaining a lane by steering control, suppressing lane departure of the vehicle, performing steering control to avoid an obstacle, a preceding vehicle, or a following vehicle, pulling the vehicle to a road shoulder, and/or changing the vehicle position (the position in the width direction) in a lane.

If the alternate control is performed, other vehicles on the periphery may be notified, by the hazard lamp or another display device, that the alternate control is being performed. Alternatively, a notification may be made by a communication device to other vehicles or other terminal devices.

In the example shown in FIG. 8, the ECU 21B controls the devices of the control apparatus 1B in the alternate control started in step S63. Here, even if it is determined in step S62 that the state is the predetermined state, the devices other than the ECU 20A of the control apparatus 1A are sometimes operable and usable without performance degradation or the like. Hence, in the alternate control of step S63, the ECU 21B may execute the alternate control using at least any of the ECUs 22A to 26A of the control apparatus 1A. Similarly, in the alternate control of step S73, the ECU 20A may execute the alternate control using at least any of the ECUs 22B to 25B of the control apparatus 1B.

As described above, when the ECU 20A of the control apparatus 1A uses the devices of the control apparatus 1B, or when the ECU 21B of the control apparatus 1B uses the devices of the control apparatus 1A, it is preferably always confirmed whether performance degradation or the like occurs in each ECU. To do this, for example, the ECU 20A may perform processing of confirming the states of the ECUs 21A to 28A of the control apparatus 1A by communication. For example, a response request signal may be transmitted from the ECU 20A to the ECUs 21A to 28A, and whether performance degradation or the like occurs in each ECU may be confirmed based on the presence/absence or contents of a response from each of the ECUs 21A to 28A. This processing may be performed at the time of communication for vehicle control or may be performed periodically. The ECU 21B may be notified of the response result. Similarly, the ECU 21B may perform processing of confirming communication states with the ECUs 22B to 25B of the control apparatus 1B. For example, a response request signal may be transmitted from the ECU 21B to the ECUs 22B to 25B, and whether performance degradation or the like occurs in each ECU may be confirmed based on the presence/absence or contents of a response from each of the ECUs 22B to 25B. This processing may be performed at the time of communication for vehicle control or may be performed periodically. The ECU 20A may be notified of the response result.

In addition, the ECU 20A may perform processing of confirming the states of the ECUs 22B to 25B of the control apparatus 1B by communication. Similarly, the ECU 21B may perform processing of confirming the states of the ECUs 21A to 28A of the control apparatus 1A by communication.

Second Embodiment

When an ECU 21B determines the state of an ECU 20A, communication lines of a plurality of systems may be used. In this embodiment, in addition to mutual communication between the ECU 21B and the ECU 20A through a communication line L3, the ECU 21B receives and monitors a signal of the ECU 20A transmitted on a communication line L2, and performance degradation or the like in the ECU 20A is determined in the reception results of the communication lines of the two systems. This can raise the determination accuracy of performance degradation or the like in the ECU 20A. In particular, the occurrence of a determination error in a case of breaking of the communication line L3 can be avoided.

Figure 9:
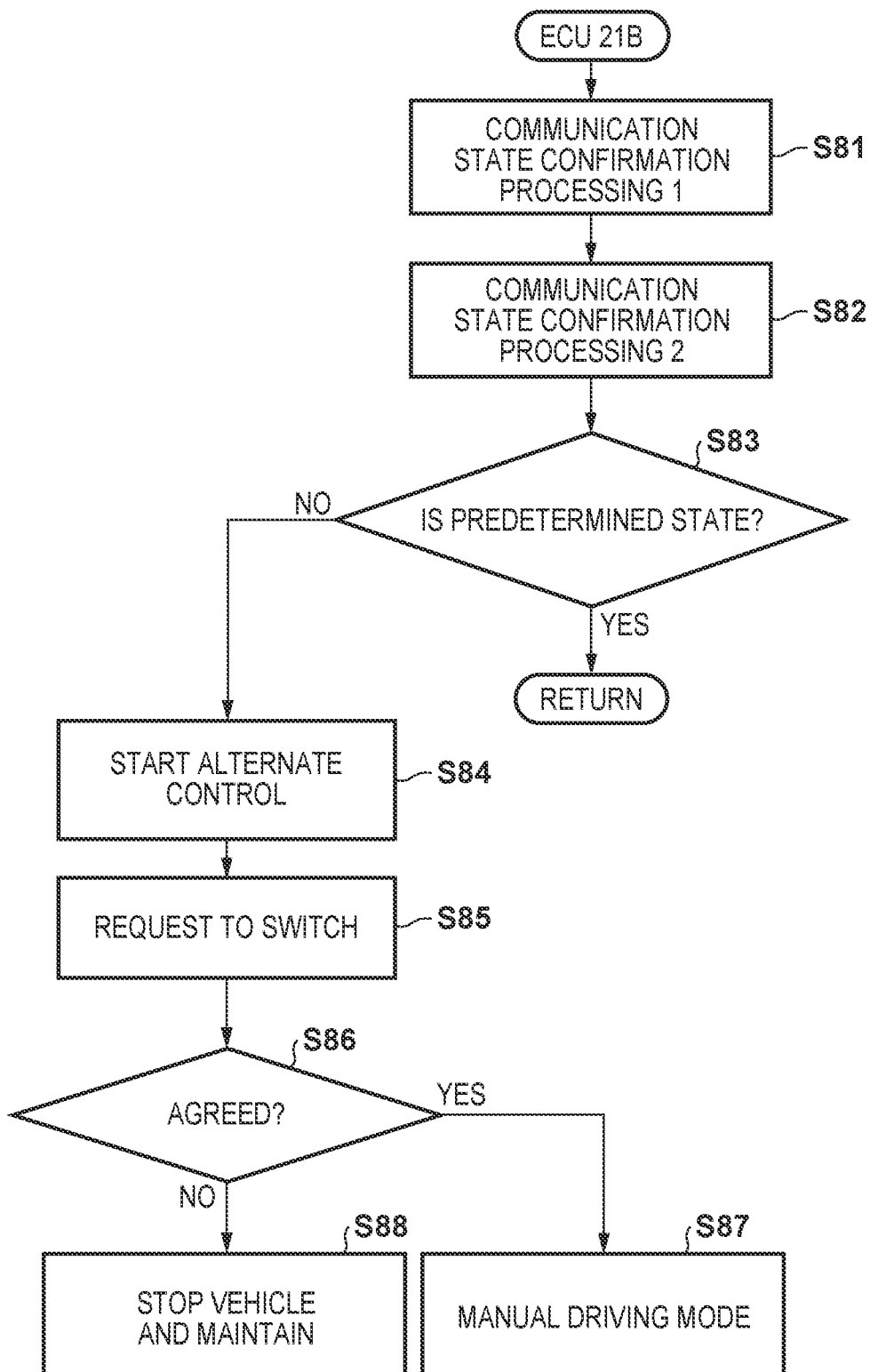
FIG. 9 is a flowchart showing an example of processing executed by a system according to another embodiment.

FIG. 9 is a flowchart showing an example of processing of the ECU 21B showing an example. In step S81, communication state confirmation processing 1 is executed. This processing is similar to that in step S61 of FIG. 8. The ECU 21B communicates with the ECU 20A through the communication line L3 and determines the state of the ECU 20A. For example, the ECU 21B outputs a response request to the ECU 20A and determines whether a response is received. Alternatively, a checksum is confirmed to determine the state of the ECU 20A. Communication state confirmation processing 1 may be performed in the communication processing executed by the ECU 20A and the ECU 21B for vehicle control.

In step S82, communication state confirmation processing 2 is executed. In this processing, the ECU 21B receives a signal output from the ECU 20A onto the communication line L2, and determines the state of the ECU 20A. The signal output from the ECU 20A onto the communication line L2 may be a control signal to ECUs 22B to 25B or may be a signal for an alive counter. Note that whether the signal on the communication line L2 is the signal transmitted from the ECU 20A can be determined if, for example, at least data representing that is included in the signal. The ECU 21B analyzes the received signal. If the signal is a control signal, it can be determined that the possibility of performance degradation or the like exists in the ECU 20A in a case in which the control signal is a non-predetermined signal. In addition, if the signal is a signal for an alive counter, it can be determined that the possibility of performance degradation or the like exists in the ECU 20A in a case in which signal transmission cannot be confirmed for a predetermined period. Additionally, as another example, the possibility of performance degradation or the like may be determined depending on whether the signal is a signal of a predetermined format.

In step S83, it is determined whether the reception results in both steps S81 and S82 represent a predetermined state (whether the possibility of performance degradation or the like exists in the ECU 20A). If only at least one reception result is not the predetermined state, it is determined that performance degradation or the like has not occurred in the ECU 20A, and the processing is ended. If neither of the reception results is the predetermined state, the process advances to step S84.

The processes of steps S84 to S87 are the same as the processes of steps S63 to S67 in FIG. 8. Alternate control and processing concerning a switching request from automated driving to manual driving are performed. The processing thus ends.

Third Embodiment

In the above-described embodiments, control of automating all of driving, braking, and steering has been explained as automated driving control executed by an ECU 20A in an automated driving mode. However, the automated driving control need only control driving, braking, and/or steering without depending on the driving operation of the driver. Controlling without depending on the driving operation of the driver can include controlling without an input from the driver to operators, or it can also be said that the driver's intention to drive the vehicle is not essential. Hence, in the automated driving control, a state in which the surroundings monitoring duty is imposed on the driver, and driving, braking, and/or steering of a vehicle V is controlled in accordance with the surrounding environment information of the vehicle V may occur, a state in which the surroundings monitoring duty is imposed on the driver, and steering, and driving and/or braking of the vehicle V are controlled in accordance with the surrounding environment information of the vehicle V may occur, or a state in which all of driving, braking, and steering of the vehicle V are controlled in accordance with the surrounding environment information of the vehicle V without the surroundings monitoring duty on the driver may occur. In addition, the control may transition to these control stages. In addition, a sensor configured to detect the state information (biological information such as a heartbeat and state information such as a facial expression and pupil) of the driver may be provided, and the automated driving control may be executed or suppressed in accordance with the detection result of the sensor.

On the other hand, driving support control (traveling support control) executed by an ECU 21B may be controlling at least one of driving, braking, and steering during the driving operation of the driver. "During the driving operation of the driver" can be said to be a case in which an input from the driver to an operator exists, or a case in which contact of the driver on an operator can be confirmed, and the driver's intention to drive the vehicle can be perceived. The driving support control can include both control executed when the driver selects its start through a switch operation or the like and control executed without selection of its start by the driver. Examples of the former control whose start is selected by the driver are follow-up control for a preceding vehicle and lane maintaining control of assisting steering to maintain traveling in a lane. These can also be defined as part of automated driving control.

Examples of the latter control executed without selection of its start by the driver are collision reduction brake control, lane departure suppression control, and erroneous start suppression control of suppressing abrupt start in a case in which an obstacle exists in the advancing direction.

In addition, a sensor configured to detect the state information (biological information such as a heartbeat and state information such as a facial expression and pupil) of the driver may be provided, and the driving support control may be executed in accordance with the detection result of the sensor.

Summary of Embodiments

1. A vehicle control system (for example, 1) according to the above embodiment is
a vehicle control system comprising:
an automated driving control unit (for example, 20A) configured to control, based on surrounding environment information (for example, D3) of a vehicle (for example, V), driving, braking, and/or steering of the vehicle without depending on a driving operation of a driver; and
a driving support control unit (for example, 21B) configured to support driving of the vehicle by the driver by controlling driving, braking, and/or steering of the vehicle,
wherein the automated driving control unit and the driving support control unit are communicably connected, and
the driving support control unit is configured to control, depending on a reception result of a signal received from the automated driving control unit, steering, and driving and/or braking of the vehicle based on the surrounding environment information (for example, D2) of the vehicle without depending on the driving operation of the driver (for example, FIG. 8).

According to this embodiment, while the distribution of control processes of vehicle control is attained by the automated driving control unit and the driving support control unit, the driving support control unit can perform automated driving control in place of the automated driving control unit, and the reliability can be improved.

2. In the above embodiment,
the system further comprises:
a first detection unit (for example, 32A) configured to detect an object around the vehicle by light;
a second detection unit (for example, 32B) configured to detect an object around the vehicle by a radio wave;
a first image capturing unit (for example, 31A) configured to detect an object around the vehicle by image capturing;
a second image capturing unit (for example, 31B) configured to detect an object around the vehicle by image capturing;
a first generation unit (for example, 21A) configured to generate first target data (for example, D1) based on detection results of the first detection unit and the first image capturing unit;
a second generation unit (for example, 21B) configured to generate second target data (for example, D2) based on detection results of the second detection unit and the second image capturing unit; and
a third generation unit (for example, 20A) configured to generate third target data (for example, D3) by integrating the first target data and the second target data,
wherein the automated driving control unit is configured to control the vehicle based on the third target data as the surrounding environment information without depending on the driving operation of the driver.

According to this embodiment, the target data are obtained based on the detection results of two systems and integrated, thereby improving the robustness. In addition, since generation and integration of the target data are performed by separate devices, individual operation loads can be reduced. Furthermore, when the detection results of the two systems are used, overdetection/detection errors can be reduced.

3. In the above embodiment,
the automated driving control unit and the driving support control unit communicate through a first communication line (for example, L3) and a second communication line (for example, L2),
the driving support control unit is configured to receive a signal on the second communication line, and
the driving support control unit is configured to control, depending on a reception result of a signal output by the automated driving control unit to the first communication line and a reception result of a signal output by the automated driving control unit to the second communication line, steering, and driving and/or braking of the vehicle based on the surrounding environment information of the vehicle without depending on the driving operation of the driver (for example, FIG. 9).

According to this embodiment, it is possible to improve the accuracy of state confirmation of the automated driving control unit and improve the reliability of vehicle control.

4. A vehicle control system (for example, 1) according to the above embodiment is a vehicle control system comprising:

an automated driving control unit (for example, 20A) configured to control, based on surrounding environment information (for example, D3) of a vehicle (for example, V), driving, braking, and/or steering of the vehicle without depending on a driving operation of a driver; and a driving support control unit (for example, 21B) configured to support driving of the vehicle by the driver by controlling driving, braking, and/or steering of the vehicle during driving of the vehicle by the driver, wherein the automated driving control unit and the driving support control unit are communicably connected, and the driving support control unit is configured to control, depending on a reception result of a signal received from the automated driving control unit, steering, and driving and/or braking of the vehicle based on the surrounding environment information (for example, D2) of the vehicle without depending on the driving operation of the driver (for example, FIG. 8).

According to this embodiment, while the distribution of control processes of vehicle control is attained by the automated driving control unit and the driving support control unit, the driving support control unit can perform automated driving control in place of the automated driving control unit, and the reliability can be improved.

5. A control method according to the above embodiment is a control method of a vehicle control system (for example, 1) including:

an automated driving control unit (for example, 20A) configured to control, based on surrounding environment information (for example, D3) of a vehicle (for example, V), driving, braking, and/or steering of the vehicle without depending on a driving operation of a driver; and a driving support control unit (for example, 21B) configured to support driving of the vehicle by the driver by controlling a driving, braking, and/or steering of the vehicle, the method comprising:

receiving a signal output from the automated driving control unit by the driving support control unit (for example, S61); and controlling, depending on a reception result in the receiving, steering, and driving and/or braking of the vehicle based on the surrounding environment information (for example, D2) of the vehicle without depending on the driving operation of the driver (for example, S63).

According to this embodiment, while the distribution of control processes of vehicle control is attained by the automated driving control unit and the driving support control unit, the driving support control unit can perform automated driving control in place of the automated driving control unit, and the reliability can be improved.

6. A vehicle control system (for example, 1) according to the above embodiment is a vehicle control system comprising:

a first processor (for example, 20A);

a first storage device (for example, 20A) configured to store a first program to be executed by the first processor;

a second processor (for example, 21B); and a second storage device (for example, 21B) configured to store a second program to be executed by the second processor, wherein the first processor executes automated driving control of controlling, based on surrounding environment information (for example, D3) of a vehicle (for example, V), driving, braking, and/or steering of the vehicle without depending on a driving operation of a driver by executing the first program, the second processor executes driving support control of supporting driving of the vehicle by the driver by controlling driving, braking, and/or steering of the vehicle by executing the second program, the first processor and the second processor are communicably connected, and by executing the second program, the second processor controls, depending on a reception result of a signal received from the first processor, steering, and driving and/or braking of the vehicle based on the surrounding environment information (for example, D2) of the vehicle without depending on the driving operation of the driver (for example, FIG. 8).

According to this embodiment, while the distribution of control processes of vehicle control is attained by the first and second processors, the second processor can perform automated driving control in place of the first processor, and the reliability can be improved.

7. A vehicle control system (for example, 1) according to the above embodiment is a vehicle control system comprising:

a first control apparatus (for example, 1A) configured to control a vehicle; and a second control apparatus (for example, 1B) configured to control the vehicle, wherein the first control apparatus comprises:

a first detection unit (for example, 31A, 32A) configured to detect a surrounding situation of the vehicle; and a first driving control unit (for example, 20A) capable of executing automated driving control of the vehicle based on a detection result of the first detection unit, the second control apparatus comprises:

a second detection unit (for example, 31B, 32B) configured to detect the surrounding situation of the vehicle; and a second driving control unit (for example, 21B) capable of executing driving support control of the vehicle based on a detection result of the second detection unit, the first driving control unit and the second driving control unit are communicably connected, and the second driving control unit is configured to execute control concerning braking and steering of the vehicle in accordance with a reception result of a signal received from the first driving control unit in a case in which the first driving control unit executes the automated driving control.

8. In the above embodiment, the vehicle control system can select an automated driving mode and a manual driving mode (for example, FIG. 4), and in a case in which the automated driving mode is selected, the first driving control unit is configured to execute the automated driving control.

9. In the above embodiment, the vehicle control system can select an automated driving mode and a manual driving mode (for example, FIG. 4), and in a case in which the manual driving mode is selected, the first driving control unit does not execute the automated driving control.

10. In the above embodiment, the vehicle control system can select an automated driving mode and a manual driving mode (for example, FIG. 4), and in a case in which the manual driving mode is selected, the second driving control unit is configured to execute control concerning braking and steering of the vehicle to support a driving operation of a driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vehicle control system comprising:
   first sensors configured to detect a surrounding situation of the vehicle;
   second sensors configured to detect a surrounding situation of the vehicle, the second sensors being separated from the first sensors;
   an automated driving controller including at least one processor and at least one storage device and configured to control, based on detection results of the first sensors and the second sensors, driving, braking, and steering of the vehicle without depending on a driving operation of a driver; and
   a driving support controller including at least one processor and at least one storage device including a first braking actuator, and configured to support driving of the vehicle by the driver by controlling braking and steering of the vehicle, the driving support controller being separated from the automated driving controller;
   a first braking device including a first steering actuator, controlled by the automated driving controller and configured to brake the vehicle,
   a first steering device including a second braking actuator, controlled by the automated driving controller and configured to steer the vehicle,
   a second braking device including a second steering actuator, controlled by the driving support controller and configured to brake the vehicle, the second braking device being separated from the first braking device, and
   a second steering device including a first braking actuator, controlled by the driving support controller and configured to steer the vehicle, the second steering device being separated from the first steering device including a first steering actuator,
   wherein the automated driving controller and the driving support controller are communicably connected, and
   the driving support controller is configured to control, depending on a reception result of a signal received from the automated driving controller, the second braking device including a second braking actuator, and the second steering device including a second steering actuator, based on detection results of the second sensors without depending on the driving operation of the driver.

2. The system according to claim 1, further comprising:
   a generator including at least one processor and at least one storage device and configured to generate target data based on detection results of the first sensors and the second sensors,
   wherein
   the first sensors includes a sensor configured to detect an object around the vehicle by light, and a camera configured to detect an object around the vehicle by image capturing;
   the second sensors includes a sensor configured to detect an object around the vehicle by a radio wave, and a camera configured to detect an object around the vehicle by image capturing; and
   the automated driving controller is configured to control the vehicle based on the target data without depending on the driving operation of the driver.

3. The system according to claim 2, wherein
   the automated driving controller and the driving support controller communicate through a first communication line and a second communication line,
   the driving support controller is configured to receive a signal on the second communication line, and
   the driving support controller is configured to control, depending on a reception result of a signal output by the automated driving controller to the first communication line and a reception result of a signal output by the automated driving controller to the second communication line, the second steering device and the second braking device based on the detection results of the second sensors without depending on the driving operation of the driver.

4. The system according to claim 1, wherein
   the automated driving controller and the driving support controller communicate through a first communication line and a second communication line,
   the driving support controller is configured to receive a signal on the second communication line, and
   the driving support controller is configured to control, depending on a reception result of a signal output by the automated driving controller to the first communication line and a reception result of a signal output by the automated driving controller to the second communication line, the second steering device and the second braking device based on the detection results of the second sensors without depending on the driving operation of the driver.

5. The system according to claim 1, wherein
   the driving support controller is configured to support driving of the vehicle by the driver by controlling the braking device and the steering device during driving of the vehicle by the driver,
   and
   the driving support controller is configured to control, depending on the reception result of the signal received from the automated driving controller, the steering device and the braking device based on the detection results of the second sensors without depending on the driving operation of the driver.

6. A control method of a vehicle control system including:
   first sensors configured to detect a surrounding situation of the vehicle;
   second sensors configured to detect a surrounding situation of the vehicle, the second sensors being separated from the first sensors;
   an automated driving controller including at least one processor and at least one storage device and configured to control, based on detection results of the first sensors and the second sensors driving, braking, and steering of the vehicle without depending on a driving operation of a driver;
   a driving support controller including at least one processor and at least one storage device and configured to support driving of the vehicle by the driver by controlling braking and steering of the vehicle, the driving support controller being separated from the automated driving controller;
   a first braking device controlled by the automated driving controller and configured to brake the vehicle;

a first steering device controlled by the automated driving controller and configured to steer the vehicle;

a second braking device controlled by the driving support controller and configured to brake the vehicle, the second braking device being separated from the first braking device; and a second steering device controlled by the driving support controller and configured to steer the vehicle, the second steering device being separated from the first steering device, the method comprising:

receiving a signal output from the automated driving controller by the driving support controller; and controlling, depending on a reception result in the receiving, the second braking device and the second steering device based on detection results of the second sensors without depending on the driving operation of the driver.

\* \* \* \* \*